US006278444B1

(12) United States Patent
Wilson et al.

(10) Patent No.: US 6,278,444 B1
(45) Date of Patent: Aug. 21, 2001

(54) LOW CURRENT FOUR-WIRE INTERFACE FOR FIVE-WIRE RESISTIVE TOUCH-SCREEN

(76) Inventors: Geoffrey D. Wilson, P.O. Box 5291, Oxnard, CA (US) 93031; Joe H. Babb, 8825 Martin Mill Pike, Knoxville, TN (US) 37920

( * ) Notice: Subject to any disclaimer, the term of this patent is extended or adjusted under 35 U.S.C. 154(b) by 0 days.

(21) Appl. No.: 09/138,289

(22) Filed: Aug. 21, 1998

(51) Int. Cl.$^7$ ................................................. G08C 21/00
(52) U.S. Cl. ..................... 345/173; 345/174; 345/204; 178/18.01; 178/20.01
(58) Field of Search .................................. 345/173–178; 178/18.1–18.7, 20.01, 20.02, 20.03

(56) References Cited

U.S. PATENT DOCUMENTS

| | | | |
|---|---|---|---|
| 3,622,105 | * | 11/1971 | Buchholz et al. . |
| 3,798,370 | * | 3/1974 | Hurst . |
| 4,220,815 | * | 9/1980 | Gibson et al. . |
| 4,631,355 | * | 12/1986 | Federico et al. . |
| 4,661,655 | * | 4/1987 | Gibson et al. . |
| 4,731,508 | * | 3/1988 | Gibson et al. . |
| 4,822,957 | * | 4/1989 | Talmage et al. . |
| 4,835,347 | * | 5/1989 | Watson ................................... 178/19 |
| 5,045,644 | * | 9/1991 | Dunthorn . |
| 5,220,136 | * | 6/1993 | Kent . |
| 5,228,562 | * | 7/1993 | Burk . |
| 5,565,657 | * | 10/1996 | Merz ....................................... 178/18 |
| 5,576,705 | * | 11/1996 | Bardachenko et al. ................. 341/20 |
| 5,717,321 | * | 2/1998 | Kerth et al. . |

FOREIGN PATENT DOCUMENTS

| | | |
|---|---|---|
| 0 631 256 A2 | 12/1994 | (EP) . |
| WO 96/42068 | 12/1996 | (WO) . |
| WO 97/34273 | 9/1997 | (WO) . |

* cited by examiner

Primary Examiner—Bipin Shalwala
Assistant Examiner—Vincent E. Kovalick

(57) ABSTRACT

A method and apparatus for making a five-wire touch-screen compatible with a four-wire interface is provided. A non-microprocessor-based converter is used that can be integrated directly into the touch-screen housing or the screen-to-interface ribbon cable. In one aspect of the converter, an analog logic and switching element routes the reference voltage from the four-wire controller to a current injection control device. The current injection control device applies a constant current to the outermost screen member of the touch-screen. When the outermost screen member and the innermost screen member of the touch screen come into contact, the current from the outermost member is injected into the resistive coating of the innermost member at the point of contact. The injected current is distributed to the four contact electrodes of the innermost member in direct proportion to the coordinates of the point of contact. Each of the four currents is converted to a voltage and routed to a logic amplifier that outputs a pair of voltages proportional to the x- and y-coordinates of the compression point. In another aspect of the converter, a feedback circuit is provided that ensures that the voltages proportional to the x- and y-coordinates continuously track the reference voltage. As a result of this feedback circuit, the coordinate measurement system is both stable and reliable.

12 Claims, 4 Drawing Sheets

LOW CURRENT FOUR-WIRE INTERFACE FOR FIVE-WIRE RESISTIVE TOUCH-SCREEN

FIELD OF THE INVENTION

The present invention relates to touch sensitive screens and, more particularly, to a system and method that allows a five-wire screen to be directly used with a four-wire operating system.

BACKGROUND OF THE INVENTION

Touch-screens are used in conjunction with a variety of display types, including cathode ray tubes (i.e., CRTs) and liquid crystal display screens (i.e., LCD screens), as a means of inputting information into a computer system. When placed over a display, the touch-screen allows a user to select a displayed icon or element by touching the screen in a location that corresponds to the desired icon or element.

A variety of touch-screen types have been developed. One type of touch screen utilizes transparent layers of resistive material separated by a pattern of insulative material. When a user presses on the touch screen, the layers of resistive material come into contact with one another and complete a circuit. By utilizing a voltage gradient in the circuit, the magnitude of the voltage at the point of screen compression can be used to determine the compression location along one axis of the screen. The use of this technique along two orthogonal axes provides the actual location at which the screen was pressed.

There are two types of resistive touch-screens dominating the market today: four-wire systems and five-wire systems. Four-wire systems have had more commercial success than five-wire systems, primarily due to their low power consumption and the simplicity of the required external circuitry. However, five-wire touch-screens are preferable from a reliability standpoint as these touch-screens are typically rated to survive at least an order of magnitude more touches than four-wire systems. The difference in reliability is due to the basic differences in screen design. In a four-wire system the top resistive layer is used to measure directional current along one axis. Therefore the conductivity of the top resistive layer must remain uniform. However, as the top surface undergoes repeated compressions, the uniformity of the resistive layer gradually degrades, leading to inaccurate readings and eventual screen failure. In contrast, all directional measurement in a five-wire system is provided by the lower resistive layer. The upper surface must merely retain its conductivity. Therefore changes in the uniformity of the resistive layer of the top surface does not degrade the performance of the five-wire system until this layer undergoes complete failure (i.e., all conductive pathways are lost).

There is an increasing trend to incorporate touch technology into a wide variety of system applications, and a new generation of microprocessor components and system software designed to serve this new market is becoming commercially available. The initial market for which these components and software were designed employed a four-wire touch screen and consequently, it is this four-wire interface that predominates. Further, there is a large customer base in the process control and medical segments of the touch-screen market that employs custom electronics and software designed to interface with four wire systems, which, by reason of their shorter life cycle, must be replaced on a regular basis. Therefore, if an end-user wishes to incorporate a five wire touch-screen into his design, or to replace a four wire touch-screen with the more reliable five wire unit, new interface electronics and software are necessary, the design of which constitutes an economic barrier to accessing these growing market segments.

From the foregoing it is apparent that a converter that would allow a five-wire touch-screen to be plugged into a four-wire controller without modifying the controller hardware and software is desirable.

SUMMARY OF THE INVENTION

The present invention provides a method and apparatus for making a five-wire touch-screen compatible with a four-wire interface. The invention utilizes a non-microprocessor-based converter that is configured into a module that can be readily integrated into a five-wire touch-screen, e.g., as a 5-pin to 4-pin adapter, for four-wire applications without modification of the five-wire touch-screen design.

In one aspect of the invention, an analog logic and switching element in the converter routes the reference voltage from the four-wire controller to a current injection control device. The current injection control device applies a constant current to the outermost screen member of the touch-screen. When the outermost screen member and the innermost screen member of the touch screen come into contact at a localized region due to a touch, the current from the outermost member is injected into the resistive coating of the innermost member at the point of contact. The injected current is distributed to the four contact electrodes of the innermost member in direct proportion to the coordinates of the point of contact. Each of the four currents is converted to a voltage and routed to a logic amplifier. The logic amplifier outputs a voltage proportional to the x-coordinate of the compression point and a voltage proportional to the y-coordinate of the compression point as expected by the four-wire controller.

In another aspect of the invention, the logic amplifier outputs a voltage that is the sum of the voltages from the four current converters. This voltage sum is routed to a comparator that compares the voltage sum with the reference voltage. If a voltage difference is detected, the current injected into the outermost screen member is adjusted accordingly. This feedback circuit ensures that the voltages proportional to the x- and y-coordinates continuously track the reference voltage, resulting in a stable and reliable coordinate measurement system.

In a further aspect of the invention, the analog logic and switching element senses when the four-wire controller enters its quiescent state, and returns a 'wake-up' signal to the controller when the touch-screen is compressed.

A further understanding of the nature and advantages of the present invention may be realized by reference to the remaining portions of the specification and the drawings.

DESCRIPTION OF THE SPECIFIC EMBODIMENTS

Figure 1:
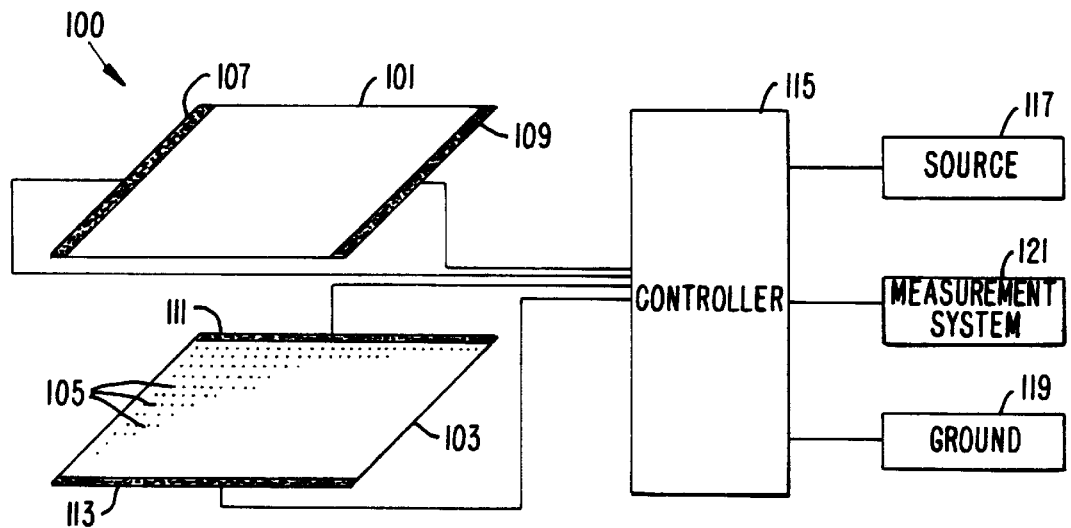
FIG. 1 is a schematic representation of a four-wire touch-screen system according to the prior art.

FIG. 1 is a schematic illustration of a four-wire touch-screen system according to the prior art. The system includes a composite touch-screen 100 that is formed of two screen members 101 and 103, each coated with a transparent layer of a resistive material. Screen members 101 and 103 are separated so that they only touch when pressure is applied to the surface of the outermost screen, for example through the use of a finger or a stylus. Although a variety of different techniques can be used to separate the two screens, typically one of the surfaces separating the two members is coated with a matrix of small insulator dots 105. Dots 105 are small enough to have minimal effect on the transparency of touch-screen 100. Such dots and other insulating means are disclosed in U.S. Pat. Nos. 4,220,815 and 3,798,370, the disclosures of which are incorporated herein for all purposes.

In order to allow the two screens to be touch sensitive, outermost screen member 101 must be deformable. Therefore screen member 101 is typically fabricated from a plastic material. Alternatively, screen member 101 can be fabricated from a flexible glass sheet. The inner surface of each screen member is coated with a transparent conductive material, such as indium-tin-oxide (i.e., ITO) or tin-antimony-oxide (i.e., ATO). Further details of such coatings may be found in U.S. Pat. No. 4,220,815.

In the four-wire system, each screen member includes a pair of conductive bus bars. Bus bars 107 and 109 are placed on the opposite ends of screen member 101. Bus bars 11 and 113 are similarly placed on the opposite ends of screen member 103 although in orthogonal positions relative to bus bars 107 and 109. All four bus bars are coupled to a state controller 115 that is coupled to a voltage source 117, a ground 119, and a voltage measurement system 121. State controller 115 may be integrated into an overall system, such as a computer, or built as a stand-alone device. Controller 115 sequentially applies voltage gradients across the two screen members by alternately applying a voltage gradient to bus bars 107/109 and bus bars 111/113.

During operation, when pressure is applied to outermost screen member 101, contact is made between the two screen members. Assuming that a voltage gradient is first applied to bus bars 107 and 109, the voltage is sampled by screen member 103. The magnitude of the sampled voltage is converted to a known distance along the measured axis. After the first measurement is made controller 115 inverts the process, applying a voltage gradient along the second orthogonal axis between bus bars 111 and 113. Controller 115 also couples the measurement system to screen member 101, thus allowing the voltage to be sampled between the second set of bus bars. The second voltage is converted to a distance along the second axis. The intersection of the measured distance along the first axis with the measured distance along the second axis defines the point on touch-screen 100 where pressure was applied.

Measurement system 121 can be designed to measure the voltages using a variety of well-known techniques. Typically measurement system 121 includes an analog to digital converter (ADC) that is used to provide a digitized output to the computer, processor, or other device utilizing the touch-screen.

In many applications, in particular those in battery-powered systems, the touch-screen is used to 'wake up' a computer from a quiescent state. In this mode of operation of the four-wire controller, the lower surface of the touch-screen is connected to ground and the upper surface is connected to an excitation voltage via a resistor. When the upper surface is connected to the lower surface by a touch action, current flows through the resistor and the voltage drop across the resistor is employed to cause the controller to exit its quiescent state.

Further details regarding four-wire resistive touch-screens are disclosed in U.S. Pat. Nos. 3,622,105 and 5,228,562, the disclosures of which are incorporated herein for all purposes.

Figure 2:
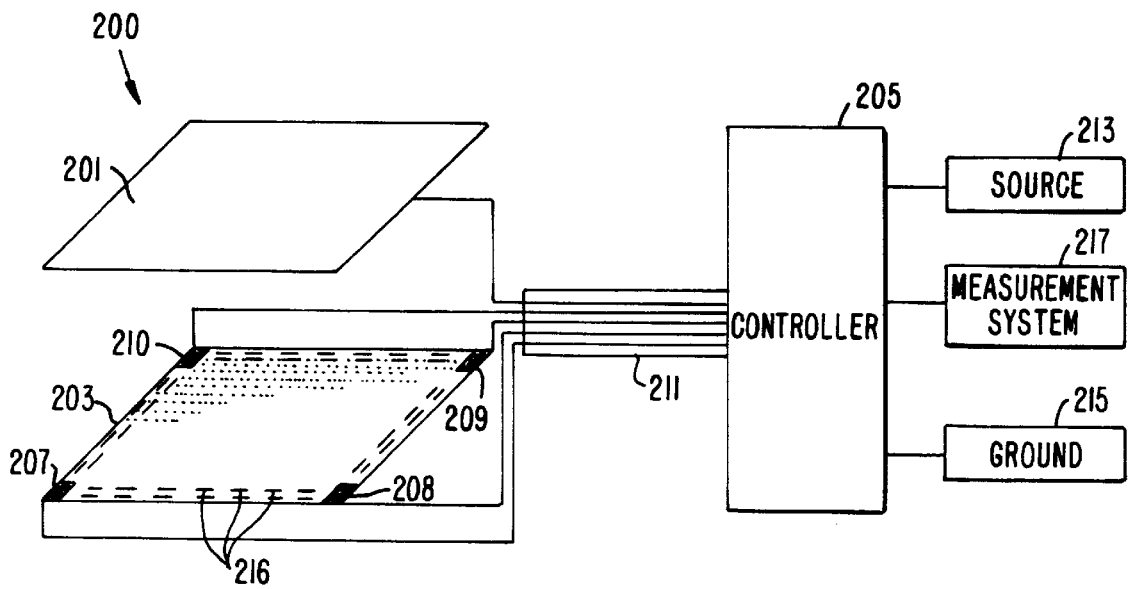
FIG. 2 is a schematic representation of a five-wire touch-screen system according to the prior art.

FIG. 2 is a schematic representation of a five-wire touch-screen according to the prior art. As in the four-wire system, the touch screen 200 is comprised of two individual members 201 and 203. However in this system outermost screen member 201 is dedicated to the function of voltage sampling and therefore does not require a homogeneous resistive layer. As a result, both the reliability and the light transmission of touch-screen 200 are greatly improved over four-wire touch-screen 100.

In the five-wire system, innermost screen member 203 includes the four electrodes necessary to determine both the x- and y-coordinates of a screen compression point while outermost screen member 201 performs the function of voltage sampling. Thus as opposed to four connections between the screen and the controller, the five-wire system requires five connections. As in the four-wire system, a controller 205 is required in order to alternate applying the excitation voltage across each of the coordinate pairs and measuring the sampled voltage.

Typically the four connections between controller 205 and screen member 203 are made at screen corners 207–210. The electrodes at corners 207–210 are coupled to controller 205 via a series of conductive traces applied to screen member 203 and a simple ribbon cable 211. In order to accurately locate the position of a screen touch, it is important to establish linear gradients along each axis. Typically linearity is achieved using a relatively complex pattern of voids within the resistive coating and a silver frit 216 that is in contact with the resistive coating. For example, U.S. Pat. No. 4,661,655 discloses a specially designed resistive bus structure designed to provide more rectilinear field lines, the disclosure of which is incorporated herein for all purposes. The present invention is not, however, limited to five-wire screen members in which linearity is achieved using voids or frit patterns.

As in the four-wire system, pressure applied to outermost screen member 201 causes contact to be made between the two screen members. During operation, controller 205 applies a voltage gradient across a pair of electrodes using a voltage source 213 and a ground 215. Measurement system 217 samples a voltage which is proportional to the distance along one axis of screen 200. Controller 205 then applies a voltage gradient across a second pair of electrodes, allowing the distance along the second, orthogonal axis to be determined. Controller 205 also provides for a touch action to 'wake up' the system from a quiescent state. In this mode of operation each corner of the screen 200 is excited with a reference voltage, and a touch action causes this voltage to be sampled by measurement system 217 and subsequently used by the system as a signal to exit its quiescent state.

Further details regarding five-wire resistive touch-screens are disclosed in U.S. Pat. Nos. 4,220,815; 4,661,655; 4,731,508; 4,822,957; 5,045,644; and 5,220,136, the disclosures of which are incorporated herein for all purposes.

Figure 3:
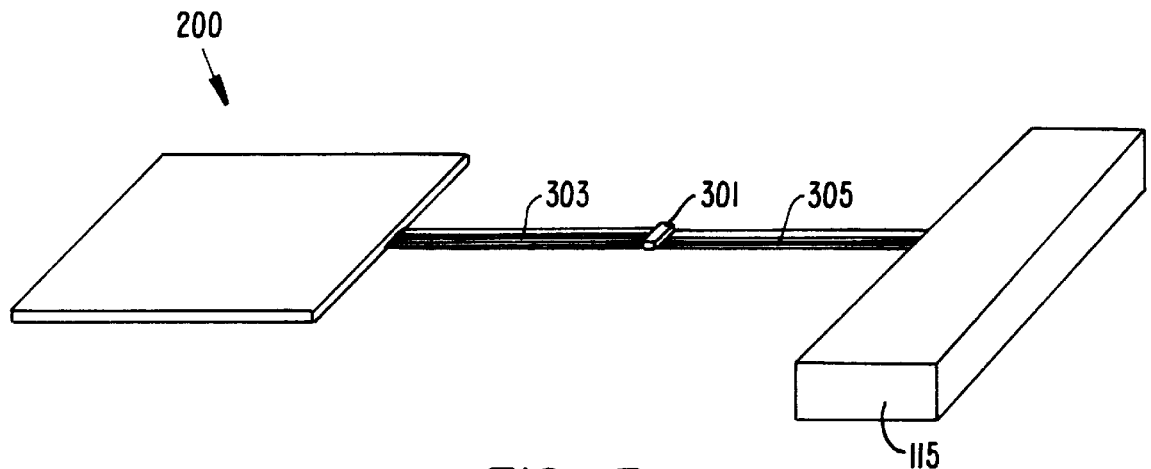
FIG. 3 is an illustration of the present invention.

FIG. 3 is an illustration of the present invention. A converter 301 allows five-wire touch-screen 200 to be coupled to four-wire controller 115. Preferably converter 301 is added in a modular manner to touch-screen 200 such that the basic five-wire touch-screen design may be used in either a four-wire or a five-wire application. For example, converter 301 may be integrated into a ribbon cable such that cable 303 is a five-wire cable and cable 305 is a four-wire cable.

Figure 4:
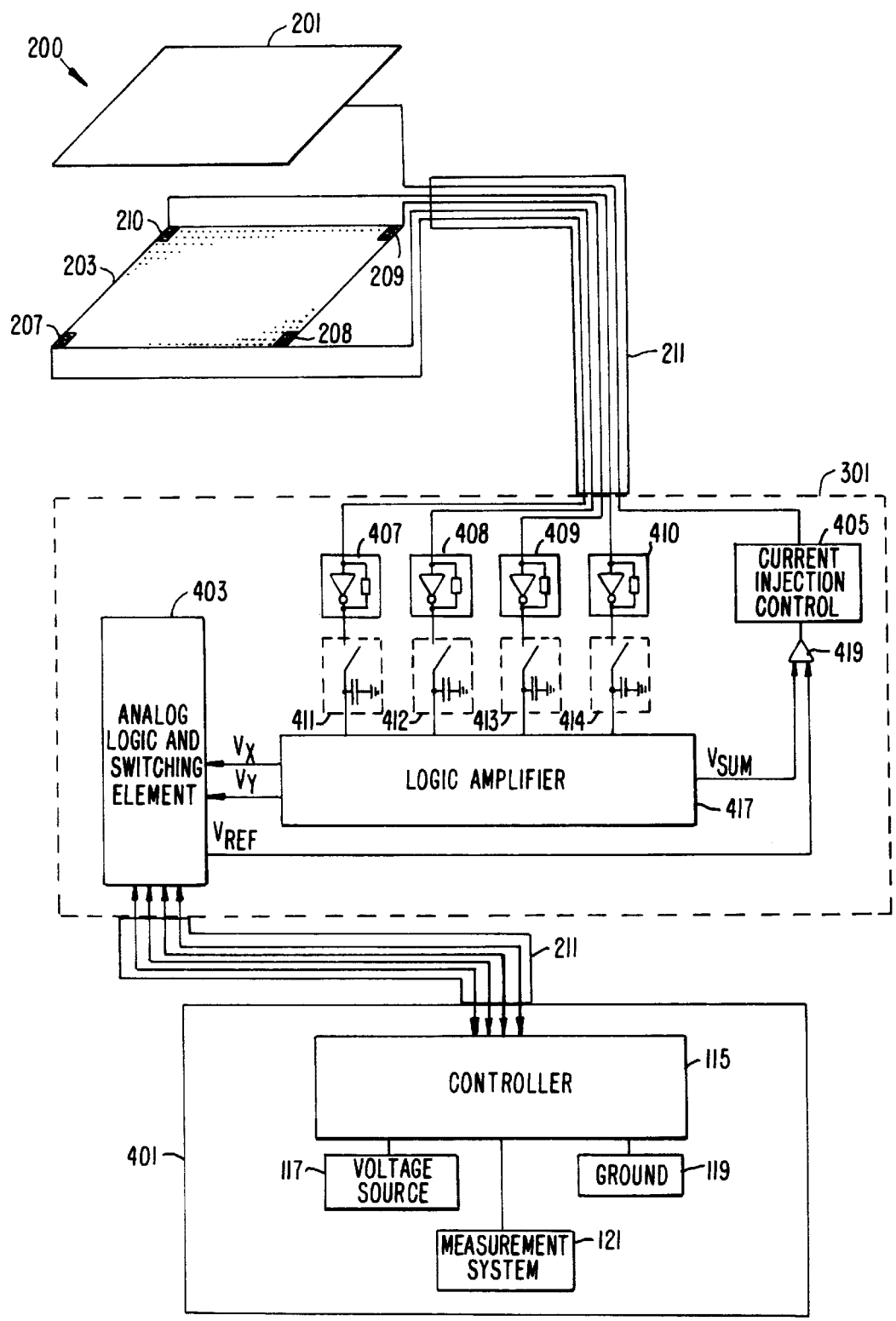
FIG. 4 is a schematic representation of the converter of the present invention.

FIG. 4 is a schematic representation of the preferred embodiment of the invention. Controller 115 is a standard four-wire controller, providing both voltage reference 117 and ground 119 to converter 301. Measurement system 121 is also coupled to converter 301, and hence touch-screen 200, via controller 115. As noted above, controller 115 may either be a stand-alone controller, or integral to a host system 401 (e.g., a computer). Host system 401 performs the processing required to report the touch coordinates.

The four-wire interface between controller 115 and converter 301 is coupled to an analog logic and switching element 403. Element 403 steers the reference voltage, $V_{ref}$, from controller 115 to a current injection control device 405 in either coordinate measurement state of the four-wire controller. Device 405 provides a constant current to screen member 201. Element 403 also responds to the requests of four-wire controller 115 for the required routing of voltages corresponding to the x- and y-coordinate information since controller 115 employs different pin connections for the x- and y-coordinate data.

When screen members 201 and 203 are compressed at a localized region, i.e., touched, the current from member 201 is injected into resistive member 203 at the point of contact. The injected current is distributed in direct proportion to the coordinates of the compression point to the four electrodes, in this example the four corner electrodes 207–210. The proportional currents from each of the four electrodes, 207–210, are routed to four current converters, 407–410, respectively. Current converters 407–410 convert the received currents to four voltages that are proportional to the coordinates of the compression point. In at least one embodiment of the invention, the output of each current converter 407–410 is fed into a sample-and-hold circuit 411–414, respectively. The sample-and-hold circuits, although not an essential feature of the invention, may be employed for local data storage to compensate for delays between four-wire state controller 115 and reception of the proportional currents.

The outputs of current converters 407–410, or of sample-and-hold circuits 411–414 if used, are coupled to a logic amplifier 417. Logic amplifier 417 outputs three voltages each time touch-screen 200 is touched. The first voltage, $V_x$, is proportional to the x-coordinate of the compression point; the second voltage, $V_y$, is proportional to the y-coordinate of the compression point; and $V_{sum}$ is the sum of the voltages from current converters 407–411.

Output $V_{sum}$ of amplifier 417 is directed to a comparator 419 coupled to current injection control device 405. Comparator 419 compares the $V_{sum}$ output of amplifier 417 to the $V_{ref}$ input directed by analog and switching element 403 from controller 115. If a voltage difference is detected between $V_{sum}$ and $V_{ref}$, the current injected by control device 405 into screen member 201 is adjusted until the two voltages are substantially equivalent. This feedback circuit ensures that $V_x$ and $V_y$ continuously track $V_{ref}$, resulting in stable and reliable coordinate measurement. Alternatively, the feedback circuit could compare currents, i.e., $I_{ref}$ and $I_{sum}$. Outputs $V_x$ and $V_y$ of amplifier 417 are routed to state controller 115 via analog and switching element 403, providing controller 115 with the measured voltages expected from a four-wire touch-screen.

Figure 5:
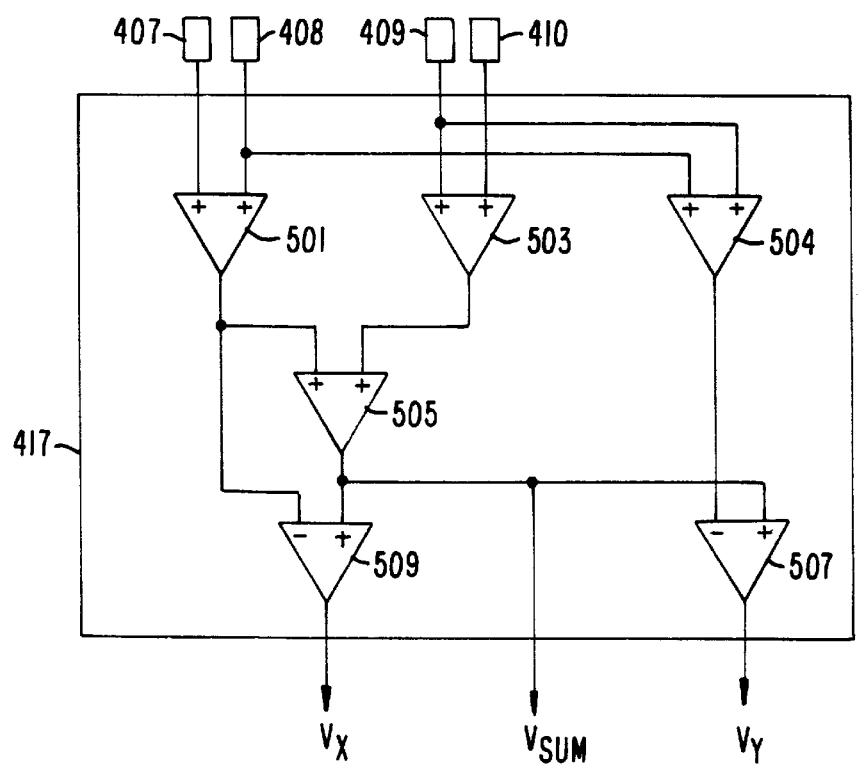
FIG. 5 is a schematic of an embodiment of the logic amplifier used in the resent invention.

FIG. 5 schematically illustrates an embodiment of logic amplifier 417. As shown, the inputs to amplifier 417 are from current converters 407–410. Alternatively, if sample-and-hold circuitry is used, the inputs to amplifier 417 are from sample-and-hold circuits 411–414. The outputs from converters 407 and 408 are summed by a summing amplifier 501. Similarly, the outputs from converters 409 and 410 are summed by a summing amplifier 503 and the outputs from converters 408 and 409 are summed by a summing amplifier 504. The outputs from amplifiers 501 and 503 are summed by a fourth summing amplifier 505, yielding the $V_{sum}$ output of logic amplifier 417. The output of amplifier 505 is also input into two difference amplifiers 507 and 509. The second input to difference amplifier 509 is the output of summing amplifier 501. The output of difference amplifier 509 is $V_x$. Similarly, the second input to difference amplifier 507 is the output of summing amplifier 504 while the output of difference amplifier 507 is $V_y$.

Figure 6:
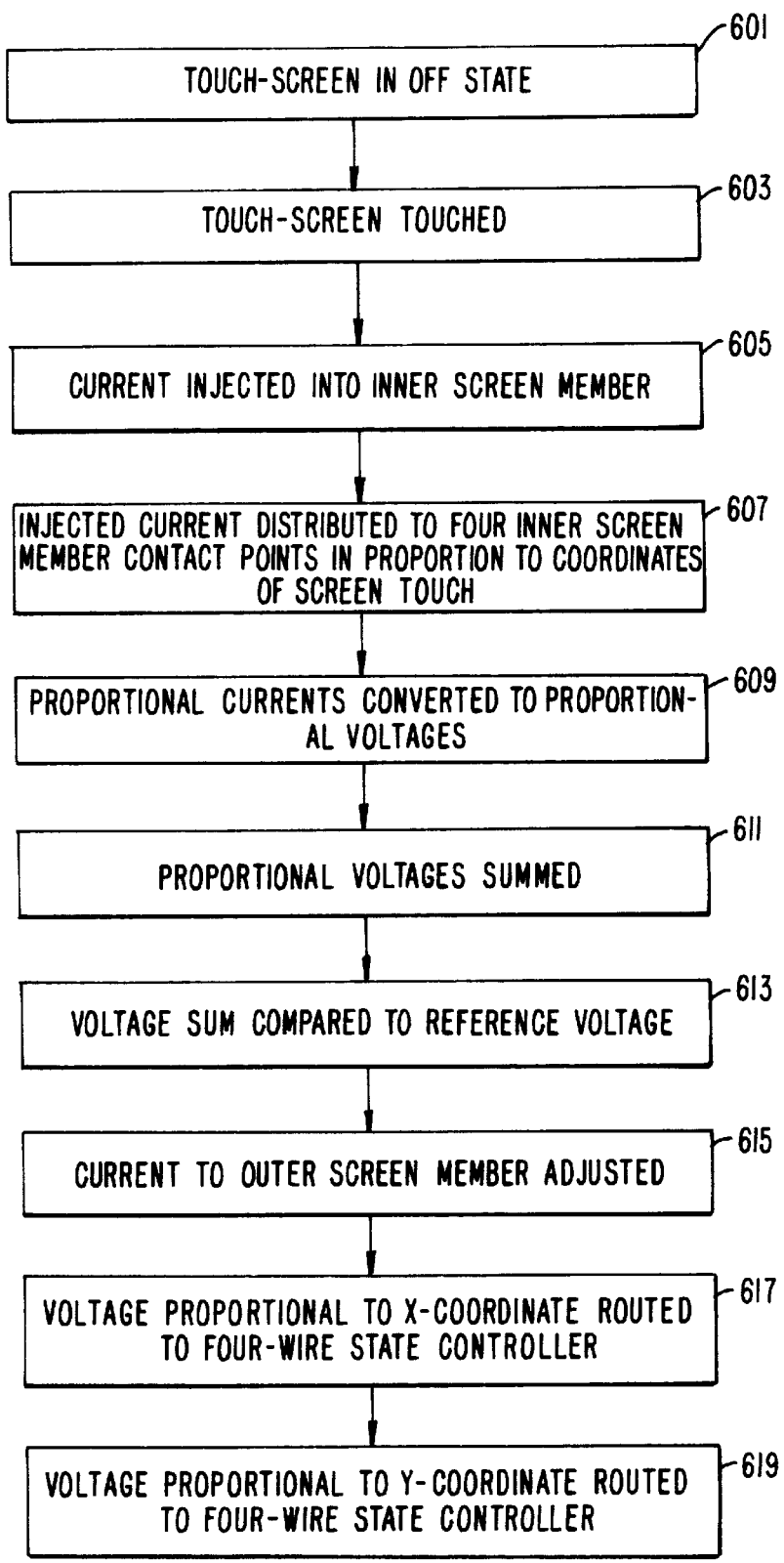
FIG. 6 illustrates the basic methodology of the invention.

FIG. 6 illustrates the basic methodology of the invention. Initially the touch-screen is in an off mode (step 601). This mode is used by most resistive touch-screens, including both four-wire and five-wire systems, to minimize power consumption during periods of non-use. In the present invention, the analog logic and switching element senses this mode and returns a signal to the four-wire controller to exit the quiescent mode and return to its measurement mode when a touch occurs.

In the present invention, although current may be injected into screen member 201, unless the screen is touched, there is no current flow into innermost screen member 203 and therefore no power consumption. Once touch-screen 200 is touched (step 603), current is injected into innermost screen member 203 (step 605) which is distributed to the four innermost screen member contact points 207–211 in proportion to the x- and y-coordinates of the screen touch (step 607). The four proportional currents are converted into four proportional voltages (step 609). Preferably the four voltages are summed (step 611) and compared to the reference voltage output by four-wire controller 115 (step 613), thereby allowing the constant current supplied to outermost screen member 201 to be adjusted in order to balance the summed voltages to the reference voltage (step 615). The detected voltages that are proportional to the x- and y-coordinates of the screen touch are then sent to controller 115 (steps 617 and 619). The system then is put on hold awaiting the next screen touch.

As will be understood by those parties familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An interface converter to couple a five-wire touch-screen to a four-wire interface, the interface converter comprising:

a current injection device, wherein said current injection device supplies a constant current to an outer screen member of said five-wire touch-screen when said five-wire touch-screen is coupled to said interface converter and said five-wire touch-screen is compressed;

a logic element coupled to said four-wire interface, said logic element sensing a mode of operation of said four-wire interface;

a switching element coupled to said logic element, wherein said switching element routes a reference voltage from said four-wire interface to said current injection device when said four-wire interface is coupled to said interface converter, wherein said constant current is based on said reference voltage;

a plurality of current converters coupled to a set of four inner screen member electrodes of said five-wire touch-screen when said five-wire touch-screen is coupled to said interface converter, wherein said plurality of current converters convert a plurality of position proportional currents to a plurality of position proportional voltages; and a logic amplifier coupled to said plurality of current converters, wherein said logic amplifier outputs a first voltage and a second voltage, wherein said first voltage is proportional to a x-coordinate of a five-wire touch-screen compression point and said second voltage is proportional to a y-coordinate of said five-wire touch-screen compression point, wherein said first and second voltages are routed to said four-wire interface when said four-wire interface is coupled to said interface converter.

2. The interface converter of claim 1, further comprising a plurality of sample-and-hold circuits coupled to said plurality of current converters.

3. The interface converter of claim 1, wherein said logic amplifier outputs a third voltage, wherein said third voltage is the summation of the voltages from said plurality of current converters.

4. The interface converter of claim 3, further comprising a comparator, wherein said reference voltage and said third voltage are routed into said comparator, wherein said constant current supplied by said current injection device is varied depending upon an output of said comparator.

5. The interface converter of claim 1, wherein said logic amplifier is further comprised of a plurality of summing and difference amplifiers.

6. The interface converter of claim 1, further comprising a ribbon cable coupled to said five-wire touch-screen, wherein said interface converter is embedded within said ribbon cable.

7. The interface converter of claim 1, further comprising a ribbon cable coupled to said five-wire touch-screen, wherein said interface converter is bonded to said ribbon cable.

8. An interface converter coupled to a five-wire touch-screen with a first screen member and a second screen member, the interface converter comprising:

a current injection device coupled to said first screen member, said current injection device supplying a constant current to said first screen member;

a switching element coupled to said current injection device, wherein said switching element routes a reference voltage to said current injection device, wherein said constant current is directly related to said reference voltage;

a plurality of current converters coupled to a set of four electrodes coupled to said second screen member, said plurality of current converters converting a plurality of position proportional currents to a plurality of position proportional voltages; and a logic amplifier coupled to said plurality of current converters, wherein said logic amplifier outputs a first voltage and a second voltage, wherein said first voltage is proportional to a x-coordinate of a five-wire touch-screen compression point and said second voltage is proportional to a y-coordinate of said five-wire touch-screen compression point.

9. The interface converter of claim 8, further comprising a comparator, wherein said logic amplifier outputs a third voltage that is the summation of said plurality of position proportional voltages from said plurality of current converters, wherein said reference voltage and said third voltage are routed to said comparator, wherein said constant current supplied by said current injection device is varied depending upon an output of said comparator.

10. The interface converter of claim 8, further comprising a four-wire interface coupled to said interface converter, wherein said four-wire interface supplies said reference voltage and wherein said first and second voltages are supplied to said four-wire interface.

11. A method of coupling a five-wire touch-screen to a four-wire interface, the method comprising the steps of:

supplying a reference voltage to a converter from said four-wire interface;

supplying a constant current by said converter to a first screen of said five-wire touch-screen, said constant current related to said reference voltage;

distributing said constant current to each of a set of four electrodes located on a second screen of said five-wire touch-screen, wherein said current distributed to each of said four electrodes is proportional to a set of coordinates corresponding to a five-wire touch-screen compression point;

converting said distributed currents to a set of four proportional voltages;

outputting a first voltage proportional to a x-coordinate of said five-wire touch-screen compression point to said four-wire interface; and outputting a second voltage proportional to a y-coordinate of said five-wire touch-screen compression point to said four-wire interface.

12. The method of claim 11, further comprising the steps of:

summing said four proportional voltages;

comparing said summed voltages to said reference voltage; and adjusting said constant current supplied by said converter to said first screen of said five-wire touch-screen until said summed voltages and said reference voltage are substantially equivalent.

* * * * *